United States Patent [19]

Puerto et al.

[11] Patent Number: 5,401,487
[45] Date of Patent: Mar. 28, 1995

[54] PROCESS TO OBTAIN ZEOLITE 4A STARTING FROM BAUXITE

[75] Inventors: Ramon A. Puerto; Juan F. Benito, both of Barcelona, Spain

[73] Assignee: Foret S.A., Barcelona, Spain

[21] Appl. No.: 131,015

[22] Filed: Oct. 1, 1993

Related U.S. Application Data

[63] Continuation of Ser. No. 801,260, Dec. 3, 1991, abandoned.

[51] Int. Cl.$^6$ ............................................. C01B 33/34
[52] U.S. Cl. .......................... 423/712; 423/DIG. 24; 423/121; 423/130
[58] Field of Search ............... 423/328.1, 330.1, 118, 423/121, 130, 700, DIG. 24, 712

[56] References Cited

U.S. PATENT DOCUMENTS

| | | | |
|---|---|---|---|
| 3,425,800 | 4/1981 | Michel | 423/328 |
| 3,868,442 | 2/1981 | Fish | 423/121 |
| 4,263,266 | 4/1981 | Michel et al. | 423/328 |
| 4,275,042 | 6/1981 | Lever | 423/130 |
| 4,661,328 | 4/1987 | Grubbs | 423/121 |
| 4,902,425 | 2/1990 | Keeney | 423/130 |

FOREIGN PATENT DOCUMENTS

| | | | |
|---|---|---|---|
| 712963 | 7/1965 | Canada | 423/329 |
| 2722535 | 11/1978 | Germany | 423/329 |

*Primary Examiner*—Mark L. Bell
*Assistant Examiner*—David Sample
*Attorney, Agent, or Firm*—Ladas & Parry

[57] ABSTRACT

The invention purpose is a process to obtain gel to elaborate Zeolite 4A, to be used in detergents due to its capacity for calcium absortion; the process lies on the obtention of an alkaline aluminum solution starting from bauxite provided by tank 3 which is attacked in digestor 1 with sodium hydroxide provided by tank 4, with a concentration of 11% minimum, with a filtration of the reacting mass and a purification 13 before the gel formation step in whose reactor 14 is also introduced an alkaline solution of SiO2 to obtain by agitation and temperature a gel which is treated in a crystallizer 15, cooling and concentrating the crystalline mass in 16, filtered in 17, and passed to a dryer 20 from where the product Zeolite 4A passes to storage 21. Bauxite residues are attacked with boiling sulphuric acid in reactor 9, filtering the resulting mass in 11 to recycle the silica and to recover the metal sulphates in solution for using them in water treatments.

3 Claims, 1 Drawing Sheet

PROCESS TO OBTAIN ZEOLITE 4A STARTING FROM BAUXITE

This is a continuation of application Ser. No. 07/801,260, filed on Dec. 3, 1991, now abandoned.

PURPOSE OF THE INVENTION

The purpose of the invention is a process to obtain Zeolite 4A starting from bauxite or from any other aluminium mineral suitable to be attacked by NaOH at atmospheric pressure.

According to the invention, the obtained Zeolite has a particle size between 1 and 10 microns (Coulter counter), an absorption capacity of calcium higher than 330 mg $CaCO_3$ per gram of anhydrous product and whiteness not less than 99.0 (Hunter lab), and consequently is specially recommended for detergent manufacturing.

This process is cheaper than others due to the use of a cheaper aluminium raw material and because it requires a minimum energy supply. Besides, it does not generate any residues, neither solids nor liquids that could affect the ecological environment.

BACKGROUND OF THE INVENTION

The processes known until now to obtain Zeolite 4A do not mention the bauxite as an aluminium source. The manufacture of Zeolite 4A starting from bauxite has several inconvenients in the crystallization step and in the color and purity of the final product, and also in the generation of contaminant residues. With the technology described in this invention, all these inconvenients are avoided, obtaining an optimum product for the manufacture of detergents. Moreover, the substitution of alumina trihydrate by bauxite, which is cheaper, and the possibility of its digestion at atmospheric pressure, notably reduces the manufacturing costs of Zeolite 4A.

STATE OF THE ART

In the existing bibliography there are no reference starting from bauxite to obtain Zeolite A. The references to U.S. Pat. No. 3,310,373, BE 840315 and IT 19617A/79 are mentioned only as an information source of the previous art known by the inventors, and that is the why and wherefore they have researched the possibility to make suitable a profitable and non-contaminant industrial process to obtain Zeolite A starting from a cheap raw material, plenty and rich in $Al_2O_3$. The single figure is a block diagram illustrating a method for producing Zeolite 4A such as the bauxite.

DESCRIPTION OF THE INVENTION

Figure 1:
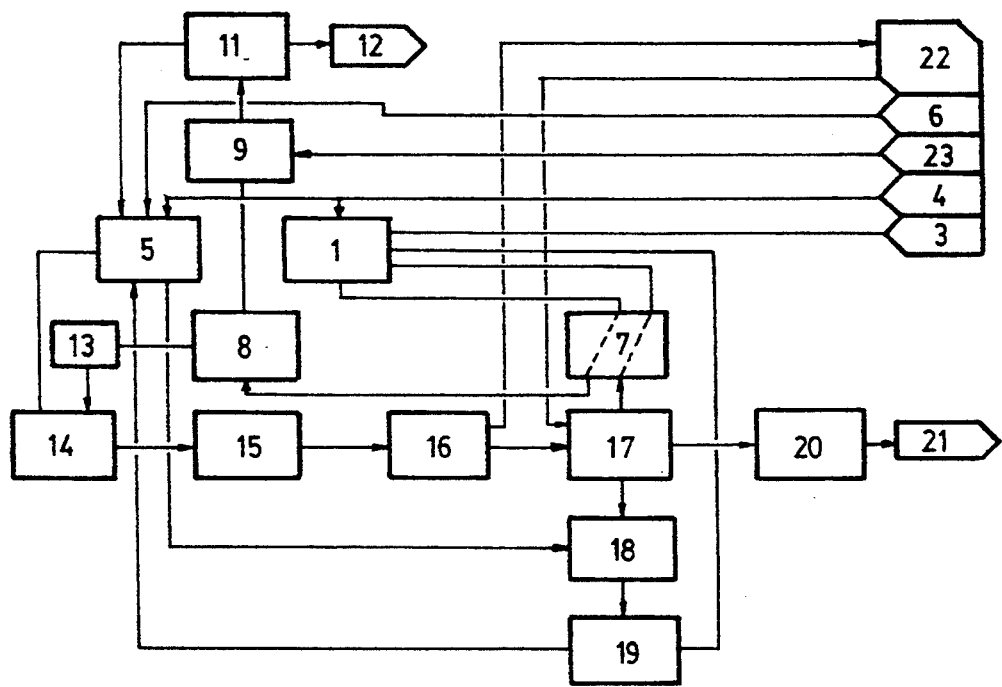
FIG. 1 is a block diagram illustrating a method for producing zeolite 4A.

According to the invention, it is started from bauxite, but it also could be used any other aluminium mineral suitable to be attacked by sodium hydroxide at atmospheric pressure. Digestion of bauxite is made in a rotative dissolver with a solution of sodium hydroxide at a temperature below 100° C., preferably between 90° and 100° C.

The aluminium alkaline solutions is filtered to be separated from the insoluble residues. The filtrate is purified by absorption of the organic material in resins of hydrophobic interaction.

The purified aluminium solution (without organic material) is driven to a reactor provided with a strong agitation where it is mixed at 65°–70° C. with an alkaline solution of $SiO_2$ obtained by digestion of silica with NaOH, forming a stable gel of sodium silicoaluminate. Crystallization is made in a conventional way; the mother liquor and washing waters, after their purification, are used again recycling them respectively to the bauxite and $SiO_2$ digestors.

Bauxite muds are subjected to a digestion with 30% sulphuric acid which disolves all the cations but keeps up the $SiO_2$ insoluble. The acid solution is filtered and the residue ($SiO_2$) is sent to the digester of $SiO_2$, being recovered for the process. The filtrate, mainly foraged by $Al_2(SO_4)_3$ is adjusted in concentration and acidity, resulting suitable to be used in residual water treatment.

EXAMPLES

Example 1

A rotative reactor is continuously fed with 100 Kg/h of an alkaline solution at 12% in NaOH and a temperature of 95° C. together with 10 Kg/h of natural guyana bauxite having the following composition:

$Al_2O_3$—55.4%

$SiO_2$—6.2%

$Fe_2O_3$—2.0%

$TiO_2$—4.6%

CaO—0.15%

MgO—0.12%

$Na_2O$—1.13%

$H_2O$—30.1%

Organic material: 0.3%

The effluent suspension is filtered in a pressure filter; the clear liquid is cooled to 40° C. and is passed through a bed of resins of hydrophobic interaction, which retains the organic material.

The fluid is heated to 70° C. and is fed continuously to a reactor provided with a strong agitation, together with an alkaline solution of $Si_2$ of molar ratio $SiO_2/Na_2O = 2.0$ pre-heated to 70° C. in such a way that the reacting molar composition results in:

94% $H_2O$; $SiO_2/Na_2O = 0.47$, $Al_2O_3/Na_2O = 0.26$

The obtained gel is transferred to a crystallizer and agitated, while its temperature is raised to 98°±2° C. in 50 minutes. The crystallization is completed after 60 minutes, being the slurry fast cooled to 75° C., filtered, washed and dried.

The dry product has a Ca absorption of 345 mg $CaCO_3$ per gram of anhydrous Zeolite, an average size of 4.0 microns with a modulation of (particles between 3 and 8 microns) of 87% and a whiteness L=99.3.

Example 2

The muds produced in Example 1 during one hour of continuous attack of the bauxite are treated with 12 Kg of 30% $H_2SO_4$ at 100° C., during 1 h, in a glass reactor provided with agitation. The resulting solution is filtered and the residue is disolved in an alkaline solution in such a way that the molar ratio $SiO_2/Na_2O$ is 2.0. This solution is used in the obtention of the gel of Example 1 with the result there mentioned.

DESCRIPTION OF THE DRAWINGS

In order to illustrate what it has been said, there is attached a sheet of drawings with a diagram of the process integrated in an industrial facility to produce Zeolite 4A.

Taking this diagram as a reference, it could be observed how to the aluminium digestor 1 arrives from tank 3 bauxite and from tank 4 sodium hydroxide. Natural silica coming from tank 6 and sodium hydroxide from tank 4 go to reactor 5.

The reaction mixture of digester 1 of aluminium mineral passes through a heat exchanger 7 where gets a temperature between 90° and 100° C. to a filtration step 8.

When the process is started from bauxite, it is obtained non-attacked residues formed by oxides and silicates of iron and aluminium which are treated with boiling sulphuric acid forming soluble sulphates of iron and aluminium; sulphuric acid comes from residues from filtration step 8 drain to the acid tank 23. Iron and aluminum are disolved and the unsoluble silica.

In filtration step 8 it is prepared a residues drain be the acid reactor 9 which is at the same time fed with sulphuric acid from tank 23.

The acid reaction product passes to a filtration step 11 where the resulting solid silica is recovered passing to the silica digester 5 and the metal sulphates solution 12 can be used for water treatment.

The filtrate coming from filtration step 8 passes to a purification step 13 where the organic material is removed by means of a treatment with hydrophobic interaction resins.

From digester 5 and from purification step 13 the reacting products pass to the gel reactor 14 where with agitation and at temperature of 60°–65° C. the gel is obtained and passed to the crystallization step in the crystallizer 15 where, with adjustable temperature and agitation, it is achieved a crystallinity of 98%, passing afterwards to a cooling and concentration step 16 which cools the mass to a temperature below 75° C. in order to optimize the absorption of calcium of the Zeolite. A filtration and washing with de-ionized water in a vacuum filter 17 removes the alkalinity excess. The filtration 17 resulting mass is treated in dryer 20, and the resulting product, Zeolite 4A, with a particle size between 1 and 10 microns pass to the storage 21.

The water coming from 16 passes to the tank 22; the mother liquor from filtration 17 through the exchanger 7 returns to the digestor 1. The washing waters of filter 17 are purified in 18 with silica alkaline solution provided by the digestor 5 and after filtration pass to the $SiO_2$ reactor 5 returning them to the process. The cake passes to reactor 1.

We claim:

1. An integrated process for production of zeolite 4A from bauxite which comprises:
   1) digesting bauxite at atmospheric pressure at a temperature of from 90° to 100° C. by use of aqueous sodium hydroxide solution having a concentration at least 11%;
   2) filtering the product obtained;
   3) passing the filtrate through a bed of hydrophobic resin to remove organic material;
   4) reacting the treated filtrate at a temperature of from 60° to 70° C. with an alkaline solution of silica having a molar ratio of $SiO_2:Na_2O$ in the range 2.0 to 2.5 in an agitated reaction to produce a sodium silica aluminate gel;
   5) crystallizing said gel to produce the desired zeolite;
   6) treating the residue from step (2) with sulfuric acid to recover metal values therefore as aqueous metal sulfate and recycling the silica residue for preparation of the alkaline solution of silica used in step (4) and
   7) recycling the mother liquor remaining after crystallization of the gel to the digestion step (1).

2. A process according to claim 1 wherein said dissolution of bauxite is effected in a rotating reactor.

3. A process according to claim 1 wherein residues left after dissolution of the bauxite are treated with boiling sulfuric acid to recover metal values therein as sulfates, the separating silica residues from dissolved sulfates and recycling said silica for production of the alkaline solution of silica used for production of the gel.

* * * * *

UNITED STATES PATENT AND TRADEMARK OFFICE
CERTIFICATE OF CORRECTION

PATENT NO. : 5,401,487
DATED : March 28, 1995
INVENTOR(S) : Ramon Artigal Puerto, et al.

It is certified that error appears in the above-identified patent and that said Letters Patent is hereby corrected as shown below:

On title page, left column before "[51]", insert --[30] Foreign application Priority Data December 14, 1990 EPO 90500119.4--.

Signed and Sealed this

Fourth Day of July, 1995

Attest:

Attesting Officer

BRUCE LEHMAN

Commissioner of Patents and Trademarks